United States Patent [19]
McLain, Jr.

[11] Patent Number: 5,943,495
[45] Date of Patent: Aug. 24, 1999

[54] COPY UTILITY METHOD AND APPARATUS FOR NON-STOP DATABASE APPLICATIONS

[75] Inventor: John V. McLain, Jr., Colorado Springs, Colo.

[73] Assignee: MCI Communication Corp., Washington, D.C.

[21] Appl. No.: 08/439,101

[22] Filed: May 11, 1995

Related U.S. Application Data

[62] Division of application No. 08/138,203, Oct. 20, 1993, abandoned.

[51] Int. Cl.[6] .................................................. G06F 17/30
[52] U.S. Cl. ........................................ 395/608; 395/601
[58] Field of Search .............................. 395/180, 182.04, 395/404, 481, 489, 600, 650, 700, 800, 601, 608, 611, 616

[56] References Cited

U.S. PATENT DOCUMENTS

| | | | |
|---|---|---|---|
| 5,089,958 | 2/1992 | Horton et al. | 395/575 |
| 5,241,670 | 8/1993 | Eastridge et al. | 395/180 |
| 5,263,154 | 11/1993 | Eastridge et al. | 395/182.04 |
| 5,293,617 | 3/1994 | Okada | 395/600 |
| 5,313,629 | 5/1994 | Abraham et al. | 395/600 |
| 5,317,731 | 5/1994 | Dias et al. | 395/600 |
| 5,375,232 | 12/1994 | Legvold et al. | 395/489 |
| 5,379,398 | 1/1995 | Cohn et al. | 395/481 |
| 5,448,718 | 9/1995 | Cohn et al. | 395/404 |
| 5,459,862 | 10/1995 | Garliepp et al. | 395/600 |
| 5,485,607 | 1/1996 | Lomet et al. | 395/600 |
| 5,497,483 | 3/1996 | Beardsley et al. | 395/180 |
| 5,551,046 | 8/1996 | Mohan et al. | 395/800 |

*Primary Examiner*—Thomas G. Black
*Assistant Examiner*—Ruay Lian Ho

[57] ABSTRACT

A copy utility for non-stop database applications allows users to continuously access a database which is undergoing back-up operations. The system includes a lock manager which controls the access of requesters to the files of the database. The back-up storage device is treated in the same manner as other requesters.

3 Claims, 4 Drawing Sheets

DB FILE ORGANIZATION

PROGRAM

FIG. 3A  CLIENT ACCESS ROUTINE 118
REQUESTOR X
BEGIN ACCESS    SEQUENCER MODULE
310 REQUEST NAME FILE
312 IF NAME FILE REQUEST GRANTED, THEN REQUEST ADDRESS FILE
314 IF ADDRESS FILE REQUEST GRANTED, THEN REQUEST PHONE FILE

---

FIG. 3B  CLIENT ACCESS ROUTINE 128
REQUESTOR Y
BEGIN ACCESS    SEQUENCER MODULE
330 REQUEST NAME FILE
332 IF NAME FILE REQUEST GRANTED, THEN REQUEST ADDRESS FILE
334 IF ADDRESS FILE REQUEST GRANTED, THEN REQUEST PHONE FILE

---

FIG. 3C  CLIENT ACCESS ROUTINE 178
REQUESTOR BACKUP
BEGIN ACCESS    SEQUENCER MODULE
350 REQUEST NAME FILE
352 IF NAME FILE REQUEST GRANTED, THEN REQUEST ADDRESS FILE
354 IF ADDRESS FILE REQUEST GRANTED, THEN REQUEST PHONE FILE

---

FIG. 4  LOCK MANAGER ROUTINE 158
405 IF REQUEST IS FOR THE NAME FILE, THEN
410 IF NAME FILE IS RELEASED AND IF ANY REQUESTOR IS QUEUED,
    THEN LOCK NAME FILE AND GRANT ACCESS TO QUEUED REQUESTOR
412 IF NAME FILE NOT LOCKED,
    THEN LOCK NAME FILE AND GRANT ACCESS TO REQUESTOR
414 IF NAME FILE IS LOCKED,
    THEN QUEUE REQUESTOR FOR NAME FILE
420 IF REQUEST IS FOR THE ADDRESS FILE, THEN
430 IF ADDRESS FILE IS RELEASED AND IF ANY REQUESTOR IS QUEUED,
    THEN LOCK ADDRESS FILE AND GRANT ACCESS TO QUEUED REQUESTOR
432 IF ADDRESS FILE NOT LOCKED,
    THEN LOCK ADDRESS FILE AND GRANT ACCESS TO REQUESTOR
434 IF ADDRESS FILE IS LOCKED,
    THEN QUEUE REQUESTOR FOR ADDRESS FILE
440 IF REQUEST IS FOR THE PHONE FILE, THEN
450 IF PHONE FILE IS RELEASED AND IF ANY REQUESTOR IS QUEUED,
    THEN LOCK PHONE FILE AND GRANT ACCESS TO QUEUED REQUESTOR
452 IF PHONE FILE NOT LOCKED,
    THEN LOCK PHONE FILE AND GRANT ACCESS TO REQUESTOR
454 IF PHONE FILE IS LOCKED,
    THEN QUEUE REQUESTOR FOR PHONE FILE
460 RETURN

COPY UTILITY METHOD AND APPARATUS FOR NON-STOP DATABASE APPLICATIONS

This Application is a Division of Application Ser. No. 08/138,203 filed Oct. 20, 1993, now abandoned.

FIELD OF THE INVENTION

The invention disclosed broadly relates to data processing systems and more particularly relates to methods and systems for database management.

BACKGROUND OF THE INVENTION

Databases need to be periodically backed-up. However, a database cannot be reliably backed-up when remote users access the database during off-hour back-up intervals. This problem occurs because the back-up software in the prior art does not have the ability to synchronize data in the files while users are simultaneously accessing and updating the database. This results in an apparently backed-up database that has an unpredictable content and which lacks data integrity.

OBJECTS OF THE INVENTION

It is therefore an object of the invention to provide a means for backing-up a database on a non-stop basis, in an improved manner.

It is another object of the invention to provide a means for backing-up a database while users can still access the database.

SUMMARY OF THE INVENTION

These and other objects, features and advantages are accomplished by the invention disclosed herein. The invention is a system and method for backing-up a non-stop database. The database will store a first one of a plurality of data units and a corresponding second one of a second plurality of data units. A requester application coupled to the database will make a first request to access a first one of the data units, followed by making a second request to access a second one of the data units. A back-up storage device is coupled to the database, for making a third request to make a back-up copy of the first one of the data units, followed by making a fourth request to make a back-up copy of a second one of the data units. A lock manager is coupled to the database, for receiving the first request and in response thereto, granting the first request, storing the identity of the requester application, and the identity of the first one of the data units, and recording a first lock state for the first one of the data units. The lock manager receives the third request after the first request, and in response thereto, denies the third request, queuing the identity of the back-up storage device and the identity of the first one of the data units. The lock manager receives the second request after the third request, and in response thereto, grants the second request, storing the identity of the requester application and the identity of the second one of the data units and records a second lock state for the second one of the data units. The lock manager receives a first release signal from the requester application to release the first lock state and in response thereto, grants the third request of the back-up storage device to back-up the first one of the data units. The lock manager receives the fourth request after the second request, and in response thereto, denies the fourth request, queuing the identity of the back-up storage device and the identity of the second one of the data units. The lock manager receives a second release signal from the requester application to release the second lock state, and in response thereto grants the fourth request of the back-up storage device to back-up a second one of the data units. In this manner, the database can be backed-up in a non-stop manner so as to enable users to continuously access and update the database while the back-up operations are carried on.

DESCRIPTION OF THE FIGURES

These and other objects, features and advantages will become more fully appreciated with reference to the accompanying figures.

FIG. 3A illustrates a client access routine.

FIG. 3B illustrates a second client access routine.

FIG. 3C illustrates a third client access routine.

FIG. 4 illustrates a lock manager routine.

DISCUSSION OF THE PREFERRED EMBODIMENT

Figure 1:
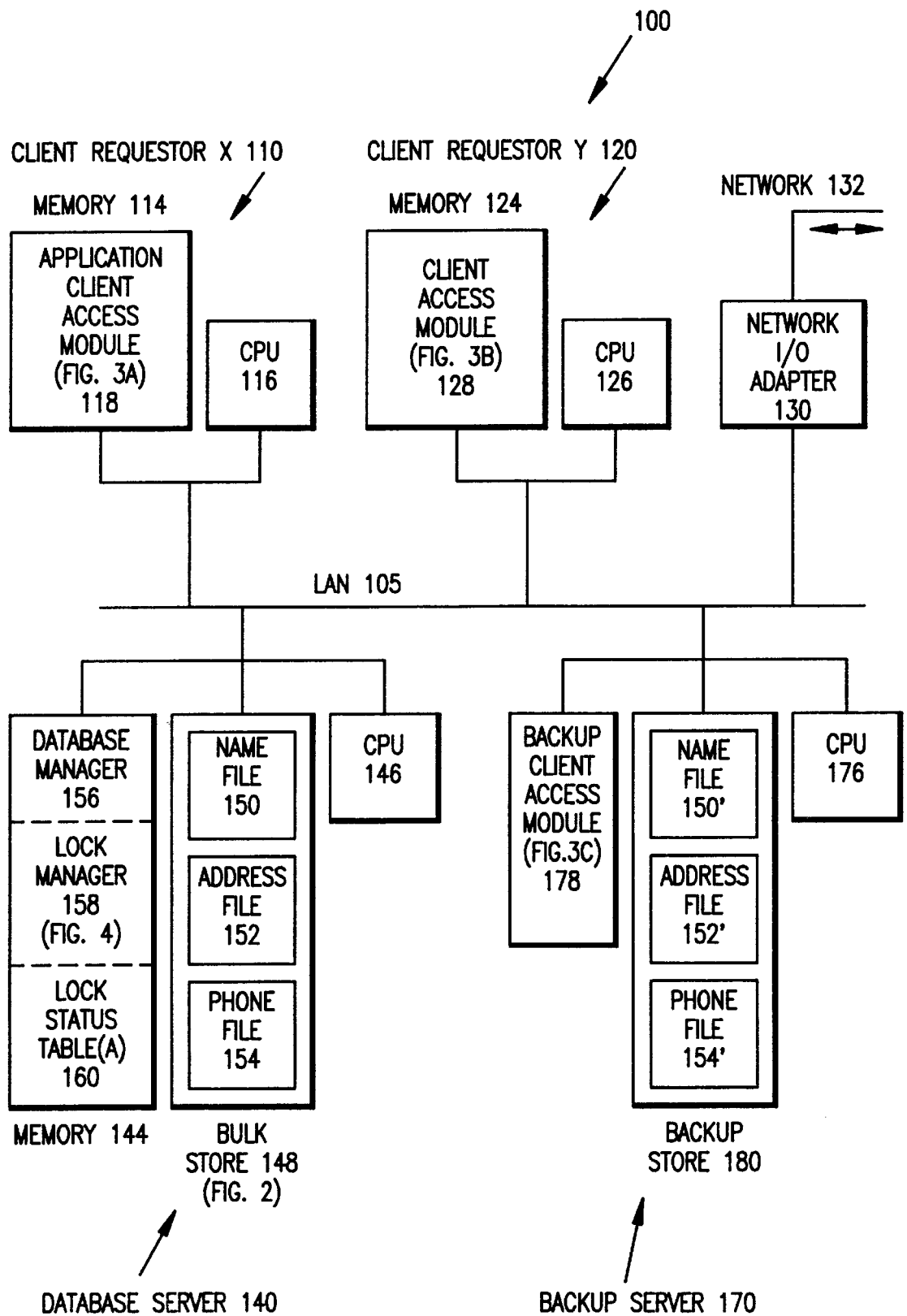
FIG. 1 is a system block diagram of the invention.

FIG. 1 shows an overall system block diagram of the invention. The system includes the local area network 105 to which is attached the client access module routine 118 which is shown in greater detail in FIG. 3A. Also attached to the local area network 105 is the CPU 116. The client access module 118 and the CPU 116 represent the client requester X 110. The memory 114 stores the client access module 118.

Also shown in FIG. 1 is the memory 124 which stores a client access module routine 128 which is shown in greater detail in FIG. 3B. Also connected to the local area network 105 is the CPU 126. The memory 124 and the CPU 126 represent the client requester Y 120. The system 100 of FIG. 1 further includes a network I/O adapter 130 which connects the LAN 105 to the network 132.

The system 100 of FIG. 1 also includes a database server 140 which includes the memory 144 within which is stored the database manager 156, a lock manager routine 158, which is shown in greater detail in FIG. 4, and the lock status table (A) 160. Also shown as part of the database server 140, is the bulk store 148, which is shown in greater detail in FIG. 2, and includes as an example application, the name file 150, the address file 152, and the phone file 154. Also as a part of the database server 140 in FIG. 1, the CPU 146 executes the instructions stored in the memory 144. The invention is not limited to the example application of name, address, and phone files. Any database that has record locks can benefit from the invention.

Also shown in the system 100 of FIG. 1 is the back-up server 170, which includes the memory 174 which stores the back-up client access module routine 178 shown in greater detail in FIG. 3C. Also as a part of the back-up server 170, is the back-up store 180 which includes the name file 150', the address file 152', and the phone file 154'. Also included in the back-up server 170 is the CPU 176, which executes the instructions stored in the memory 174.

Figure 2:
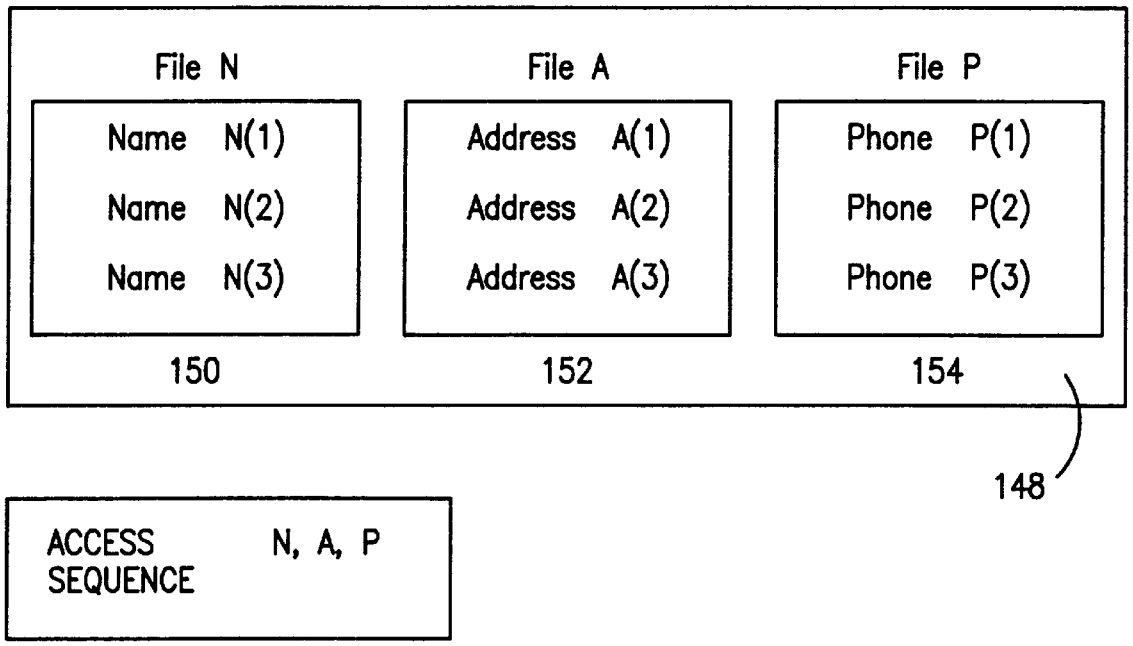
FIG. 2 is an organizational diagram of an example database file, an access sequence table, and a lock status table.

FIG. 2 shows the database file organization which includes the bulk store 148 which contains the name file 150, the address file 152, and the phone file 154. Also shown is a table storing the access sequence, for example, N followed by A, followed by P. Also shown is a lock status table 160 which lists the lock as on or off, the current requester, and the queued requesters for each file.

In FIG. 3A, the client access module routine 118 stored in the memory 114 of the client requester X 110, includes the step 310 to request file name, the step 312 which determines if the name file request is granted, then it requests an address file. Step 314 determines if the address file request is granted, and then it requests the phone file.

FIG. 3B shows the client access module routine 128 stored in the memory 124 of the client requester Y 120. Step 330 requests the name file. Step 332 determines if the name file request was granted, then requests the address file. Step 334 determines if the address file request was granted, then requests the phone file.

FIG. 3C illustrates the client access module routine 178 which is stored in the memory 174 of the back-up server 170. The routine includes step 350 which requests the name file. Step 352 determines if the name file request was granted, then requests the address file. Step 354 determines if the address file request was granted, then requests the phone file.

FIG. 4 illustrates the lock manager routine 158 which is stored in the memory 144 of the database server 140. Routine 158 includes step 405 which determines if the request is for the name file, and it then goes to step 410. Step 410 determines if the name file is released and if any requester is queued, then it locks the name file and grants the access to the queued requester. Then step 412 determines if the name file is not locked, then it locks the name file and grants the access to the requester. Step 414 determines if the name file is locked, then it queues the requester for the name file. Step 420 determines if the request is for the address file, then it passes to step 430. Step 430 determines if the address file is released and if any requester is queued, then it locks the address file and grants the access to the queued requester. Then step 432 determines if the address file is not locked, then it locks the address file and grants the access to the requester. Step 434 determines if the address file is locked, then it queues the requester for the address file. Then step 440 determines if the request is for the phone file, then it passes to step 450. Step 450 determines if the phone file is released and if any requester is queued, then it locks the phone file and grants the access to the queued requester. Step 452 determines if the phone file is not locked, then it locks the phone file and grants the access to the requester. Then step 454 determines if the phone file is locked, then it queues the requester for the phone file. Then step 460 then returns to the main program.

Figure 5:
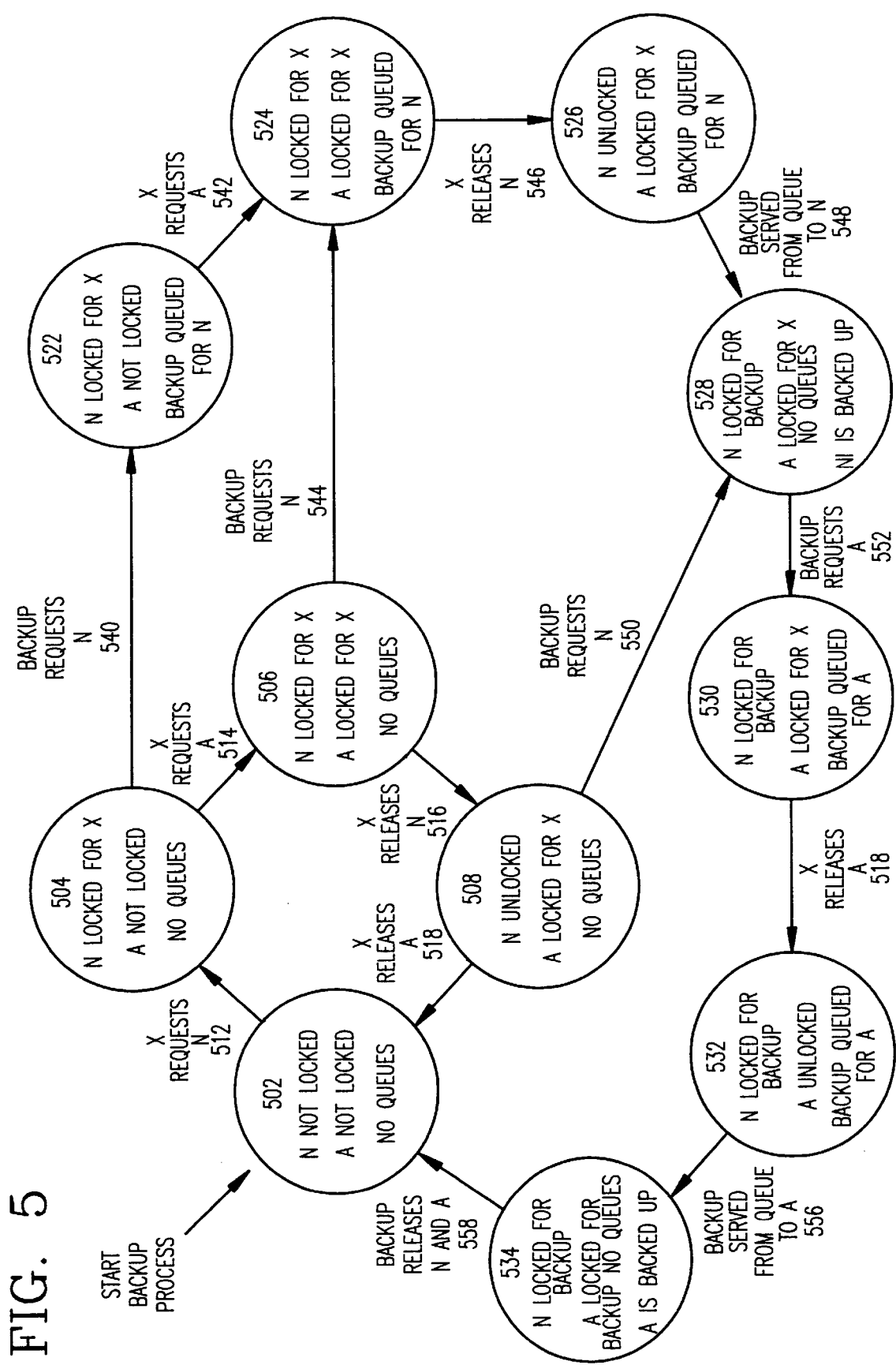
FIG. 5 illustrates a state diagram of the overall operation of the invention.

FIG. 5 is a state diagram illustrating the sequence of operations for the invention. The state diagram starts the back-up process at state 502 where N is not locked, A is not locked, and there are no queues. If the event that X requests N at 512 occurs, then state 502 passes to state 504 where N is locked for X, A is not locked, and there are no queues.

If the event that a back-up request N 540 occurs, then state 504 passes to state 522 where N is locked for X, A is not locked, and the back-up is queued for N. Alternately, if the event that X requests A 514 occurs, then state 504 passes to state 506 where N is locked for X, A is locked for X, and there are no queues.

State 522 has N locked for X and A not locked and the back-up queued for N. If the event that X requests A 542 occurs, then state 522 passes to state 524 where N is locked for X, A is locked for X, and the back-up is queued for N.

Returning to state 506, if the event that the back-up request N 544 occurs, then state 506 passes to state 524.

State 524 where N is locked for X, A is locked for X, and the back-up is queued for N, can have the event occur that X releases N at 546. If X releases N at 546, then state 524 passes to state 526 where N is unlocked, A is locked for X, and the back-up is queued for N. Then if the event occurs of a back-up served from the queue to N 548, then state 526 passes to state 528 where N is locked for back-up and A is locked for X, there are no queues and N is backed-up.

Returning to state 506, if the event that X releases N 516 occurs, then state 506 passes to state 508 where N is unlocked, A is locked for X, and there are no queues. State 508 can have the event occur of the back-up request N at 550. If the event 550 occurs, then the state 508 passes to state 528.

In state 528, if the event occurs that the back-up requests A at 552, then state 528 passes to state 530 where N is locked for the back-up, A is locked for X, and the back-up is queued for A. In state 530, if the event occurs that X releases A at 518, then state 530 passes to state 532 where N is locked for back-up, A is unlocked, and the back-up is queued for A.

In state 532, if the event occurs that the back-up is served from a queue to A at 556, then state 532 passes to state 534 where N is locked for the back-up, A is locked for the back-up, there are no queues, and A is backed-up.

In state 534, if the event occurs that the back-up releases N and A at 558, then state 534 returns to the initial state 502 where N is not locked, A is not locked, and there are no queues.

Returning to state 508, if the event occurs that X releases A at 518, then the state 508 passes to state 502 where N is not locked, A is not locked, and there are no queues.

In this manner, the operation of the invention enables non-stop database applications to take place wherein users can access the database during a period when the database is being continuously backed-up.

Although a specific embodiment of the invention has been disclosed, it will be understood by those having skill in the art that changes can be made to that specific embodiment without departing from the spirit and the scope of the invention.

What is claimed is:

1. A system for backing-up a non-stop database, comprising:
    a database storing a first one of a first plurality of data units and a corresponding second one of a second plurality of data units;
    a requester application coupled to the database, for making a first request to access the first one of the data units followed by making a second request to access the second one of the data units;
    a back-up storage device coupled to the database, for making a third request to make a back-up copy of the first one of the data units followed by making a fourth request to make a back-up copy of the second of the data units;
    a lock manager coupled to the database for receiving the first request and in response thereto, granting the first request, storing the identity of the requester application and the identity of the first one of the data units and recording a first lock state for the first one of the data units;
    said lock manager receiving the third request after the first request and in response thereto, denying the third request, queuing the identity of the back-up storage device and the identity of the first one of the data units;

said lock manager receiving the second request after the third request and in response thereto, granting the second request, storing the identity of the requester application and the identity of the second one of the data units and recording a second lock state for the second one of the data units;

said lock manager receiving a first release signal from the requester application to release the first lock state, and in response thereto granting the third request of the back-up storage device to back-up the first one of the data units;

said lock manager receiving the fourth request after the second request and in response thereto, denying the fourth request, queuing the identity of the back-up storage device and the identity of the second one of the data units;

said lock manager receiving a second release signal from the requester application to release the second lock state, and in response thereto granting the fourth request of the backup storage device to back-up the second one of the data units.

2. A method in a data processing system, for backing-up a non-stop database, comprising:

storing a first one of a first plurality of data units and a corresponding second one of a second plurality of data units in a database;

making a first request to access the first one of the data units followed by making a second request to access the second one of the data units;

making a third request to make a back-up copy of the first one of the data units followed by making a fourth request to make a back-up copy of the second of the data units;

receiving the first request and in response thereto, granting the first request, storing the identity of the requester application and the identity of the first one of the data units and recording a first lock state for the first one of the data units;

receiving the third request after the first request and in response thereto, denying the third request, queuing the identity of the back-up storage device and the identity of the first one of the data units;

receiving the second request after the third request and in response thereto, granting the second request, storing the identity of the requester application and the identity of the second one of the data units and recording a second lock state for the second one of the data units;

receiving a first release signal to release the first lock state, and in response thereto granting the third request to back-up the first one of the data units;

receiving the fourth request after the second request and in response thereto, denying the fourth request, queuing the identity of a back-up storage device and the identity of the second one of the data units;

receiving a second release signal from the requester application to release the second lock state, and in response thereto granting the fourth request to back-up the second one of the data units.

3. A system for backing-up a non-stop database, comprising:

a database for storing a plurality of data units;

a requester application, coupled to said database, for making at least a first request to access a first one of said plurality of data units;

a back-up storage device, coupled to said database, for making a request to make at least a back-up copy of the data stored in said first one data unit;

a lock manager coupled to said database, said lock manager, upon receipt of said first request, grants said first request provided that said first data unit is available, and stores the identity of said requester application and the identity of said first one data unit and records a first lock state for said first one data unit;

after said first request for access to said first one data unit, said lock manager, in receipt of a second request for access to said first one data unit, denying said second request, and queuing said second request; and wherein upon receipt of a release signal from said requester application to release said first lock state, said lock manager grants a request of said back-up storage device to back-up the data of said first one data unit.

* * * * *